United States Patent
Golan et al.

(10) Patent No.: US 11,180,918 B2
(45) Date of Patent: Nov. 23, 2021

(54) MODULAR THERMAL PANELS FOR BUILDING SHELLS AND METHODS OF ASSEMBLING AND DISASSEMBLING THEREOF

(71) Applicant: Elinor Golan, Tel Aviv (IL)

(72) Inventors: Elinor Golan, Tel Aviv (IL); Rani Ziss, Ramat Gan (IL)

(73) Assignee: Elinor Golan, Tel Aviv (IL)

( * ) Notice: Subject to any disclaimer, the term of this patent is extended or adjusted under 35 U.S.C. 154(b) by 0 days.

(21) Appl. No.: 17/266,373

(22) PCT Filed: Jul. 8, 2019

(86) PCT No.: PCT/IL2019/050759
§ 371 (c)(1),
(2) Date: Feb. 5, 2021

(87) PCT Pub. No.: WO2020/183446
PCT Pub. Date: Sep. 17, 2020

(65) Prior Publication Data
US 2021/0262230 A1 Aug. 26, 2021

(30) Foreign Application Priority Data
Mar. 14, 2019 (IL) .......................................... 265388

(51) Int. Cl.
*E04C 2/52* (2006.01)
*E04B 2/90* (2006.01)
(Continued)

(52) U.S. Cl.
CPC ................ *E04C 2/523* (2013.01); *E04B 2/90* (2013.01); *E04C 2/34* (2013.01); *E04C 2/46* (2013.01);
(Continued)

(58) Field of Classification Search
None
See application file for complete search history.

(56) References Cited

U.S. PATENT DOCUMENTS 4,557,253 A   12/1985   Talbert et al.
5,347,779 A    9/1994   Jordan
(Continued)

FOREIGN PATENT DOCUMENTS

JP         H07-229267 A     8/1995

*Primary Examiner* — Joshua K Ihezie
(74) *Attorney, Agent, or Firm* — Dilworth & Barrese, LLP

(57) ABSTRACT

A shell system for a building, facilitating internal bottom-up flow of air inside the shell system, the shell system includes a plurality of modular thermal panels, and connecting means for interconnecting the plurality of modular thermal panels or a portion thereof Each of the modular thermal panel includes an enclosed frame having two side faces, a top face and a bottom face, wherein two openings are formed in the frame's faces: a sealingly enclosed internal face and a sealingly enclosed external fac wherein an inner gap, filled with air, is formed between the internal face and the external face. At least one frame-opening is formed in each of the faces of the frame, allowing air to flow between adjacent modular thermal panels, that are sealingly interconnected, while allowing the inner air flow.

20 Claims, 10 Drawing Sheets

(51) Int. Cl.
  *E04C 2/34* (2006.01)
  *E04B 2/00* (2006.01)
  *E04C 2/00* (2006.01)

(52) U.S. Cl.
  CPC .............................. *E04C 2002/004* (2013.01); *E04C 2002/3488* (2013.01)

(56) References Cited

U.S. PATENT DOCUMENTS

| | | | |
|---|---|---|---|
| 6,205,731 B1 * | 3/2001 | Gerhaher | E04C 2/34 52/506.01 |
| 2011/0036539 A1 | 2/2011 | Balduini et al. | |
| 2019/0210317 A1 * | 7/2019 | Walker | E04B 1/7076 |

* cited by examiner

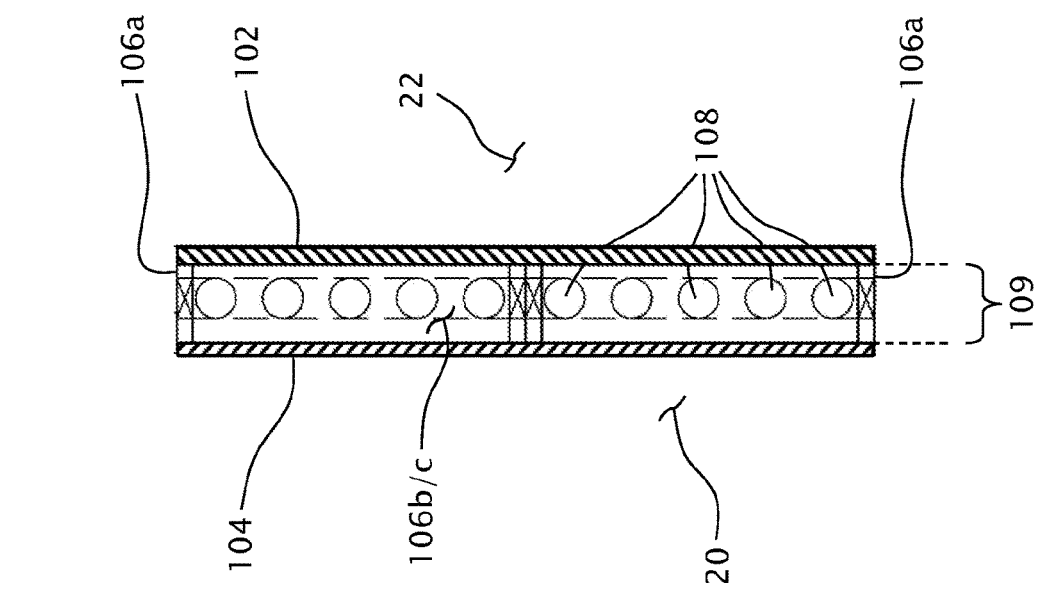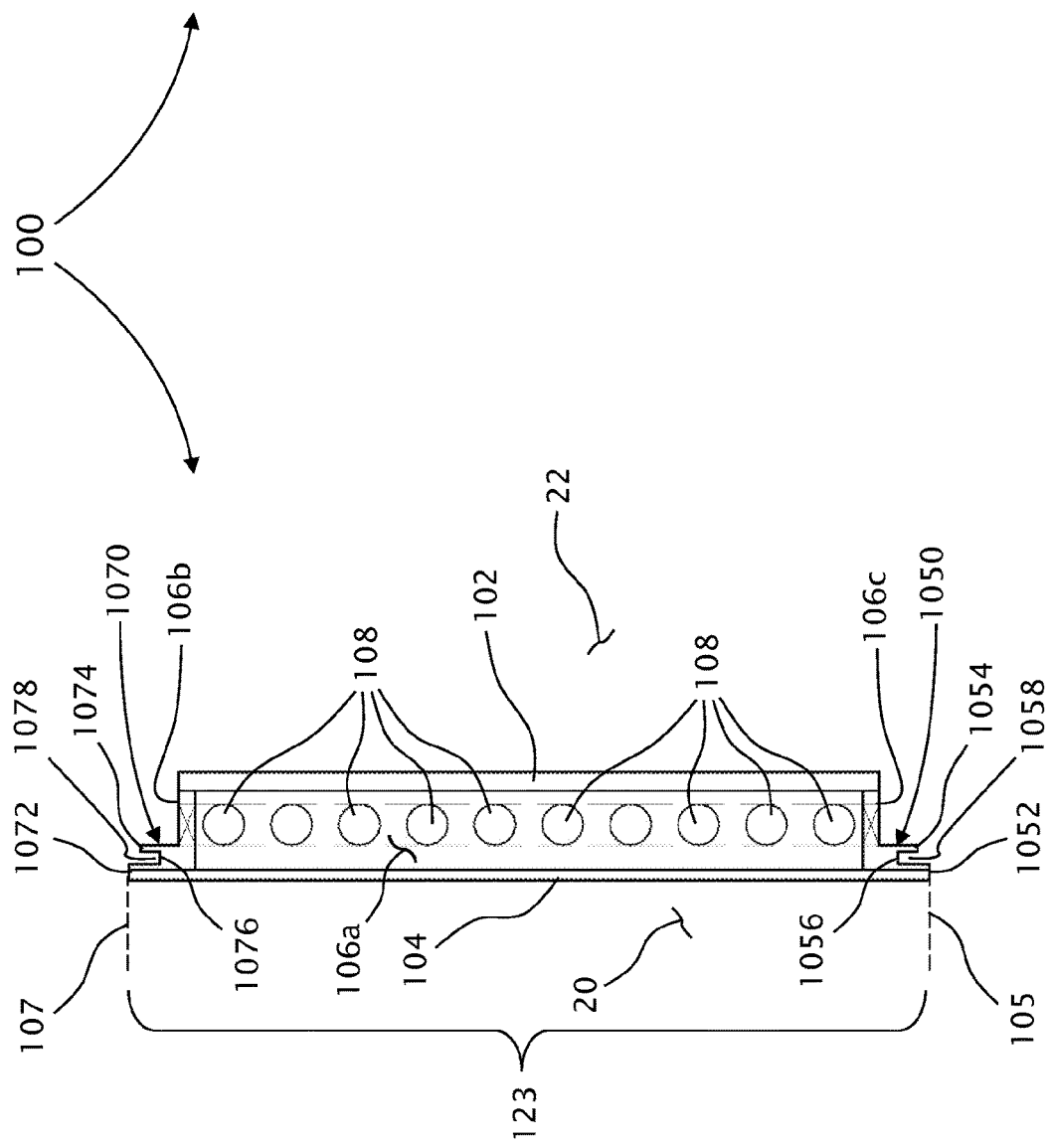

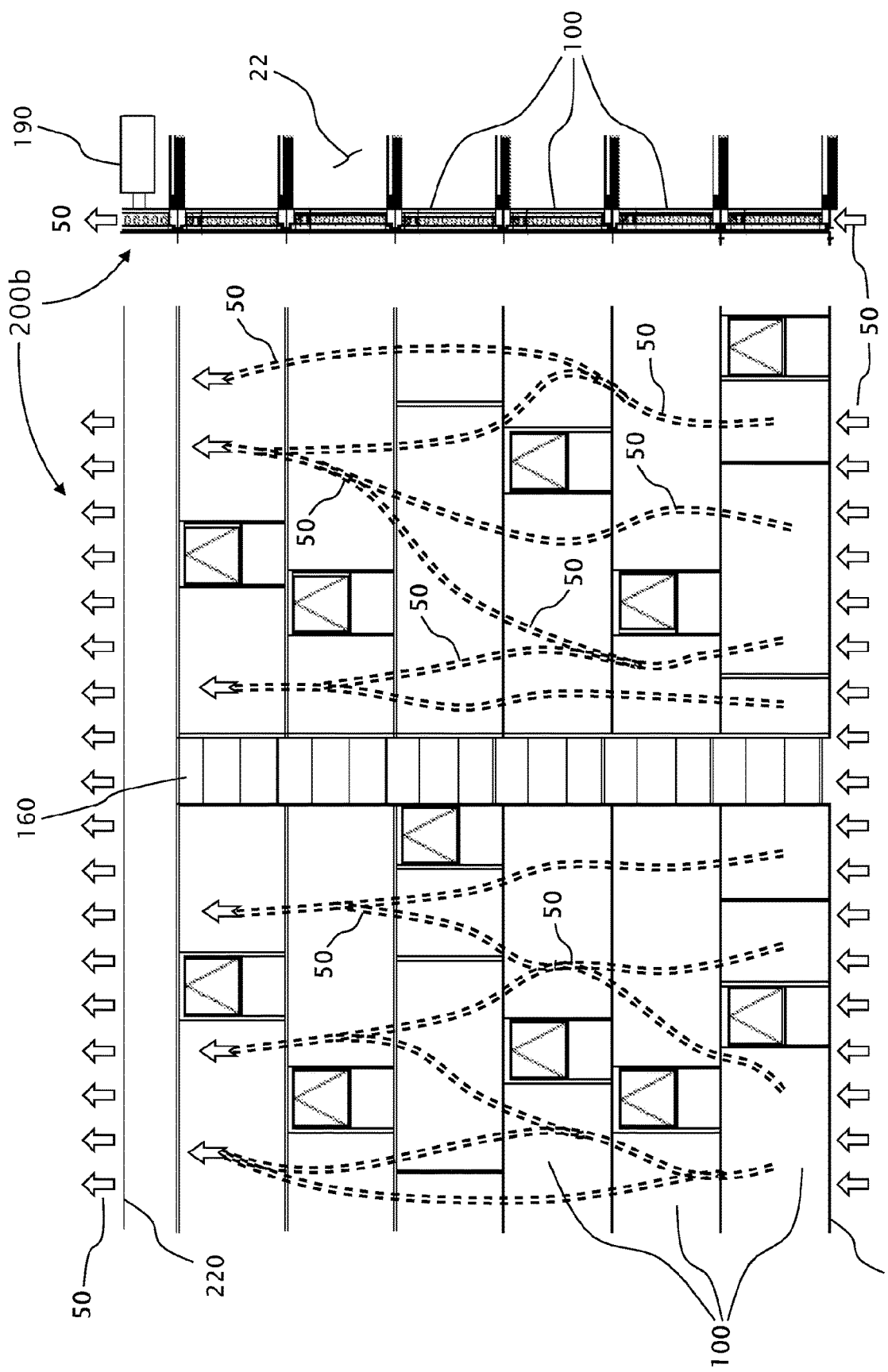

CROSS SECTION 1-1

Detailed A

Detailed B

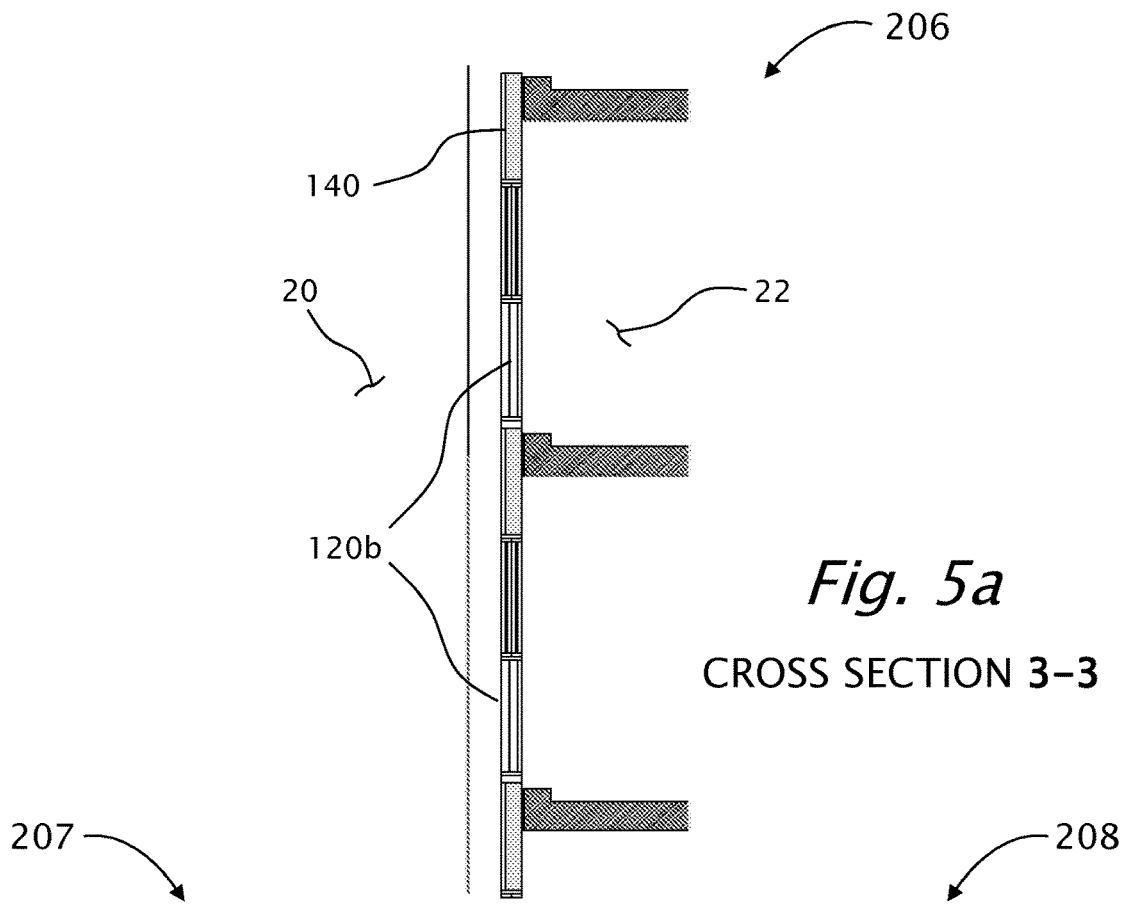
*Fig. 5a*
CROSS SECTION 3-3
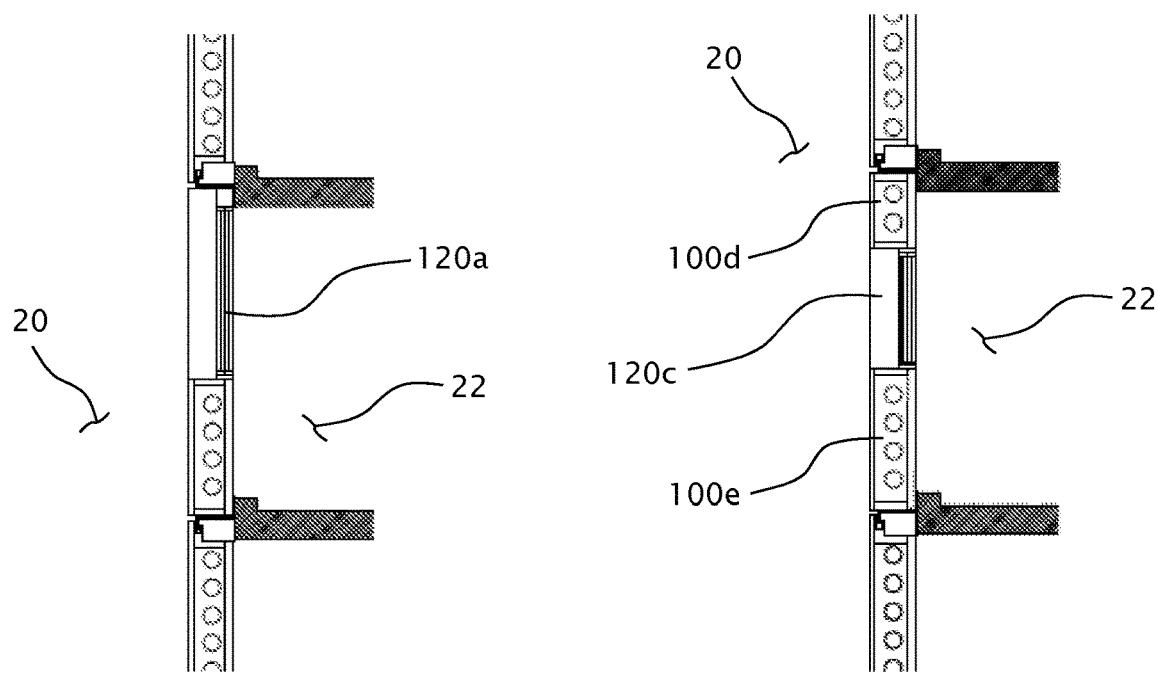
*Fig. 5c*
CROSS SECTION 5-5
*Fig. 5b*
CROSS SECTION 4-4

CROSS SECTION 2-2

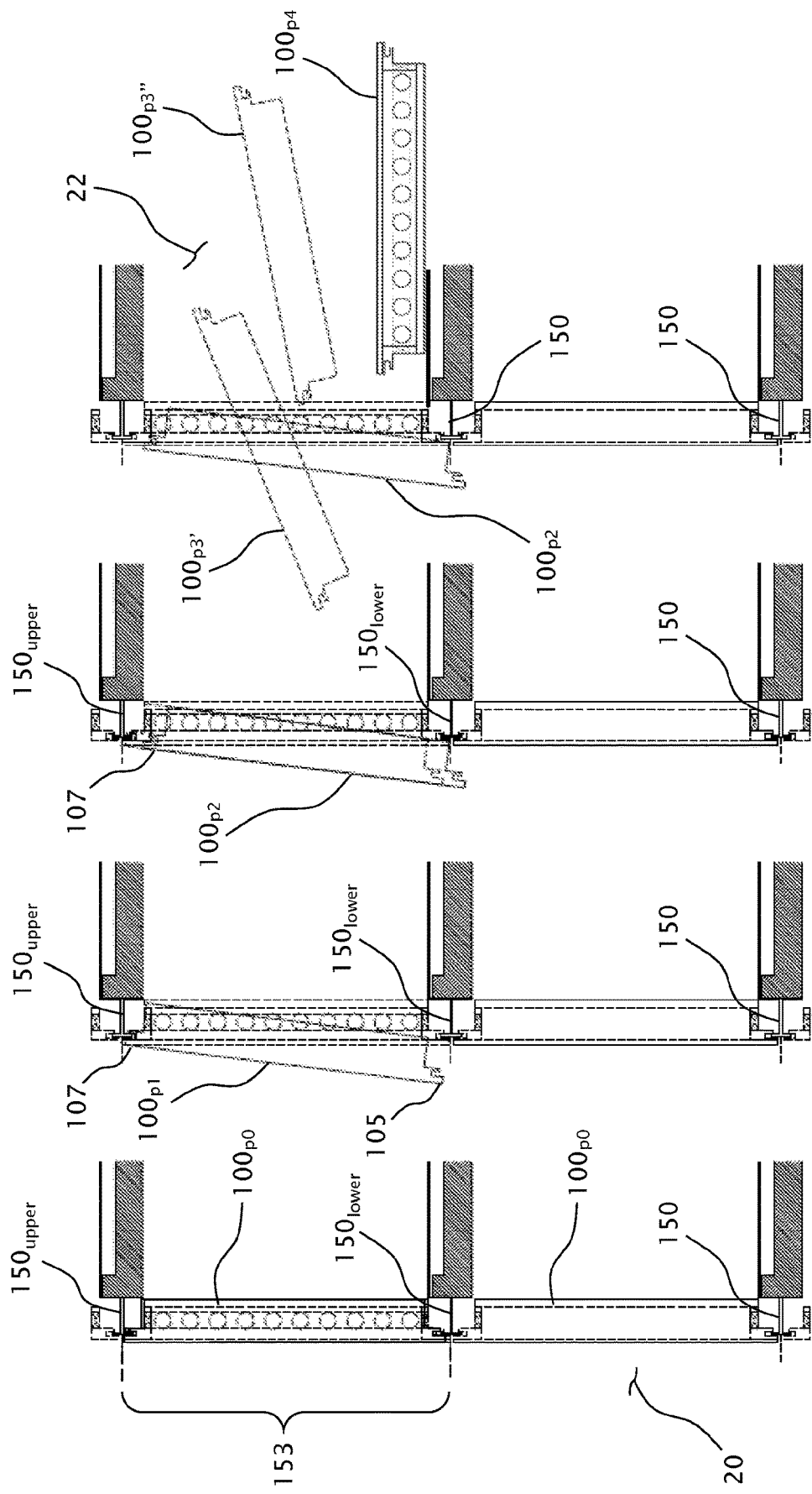

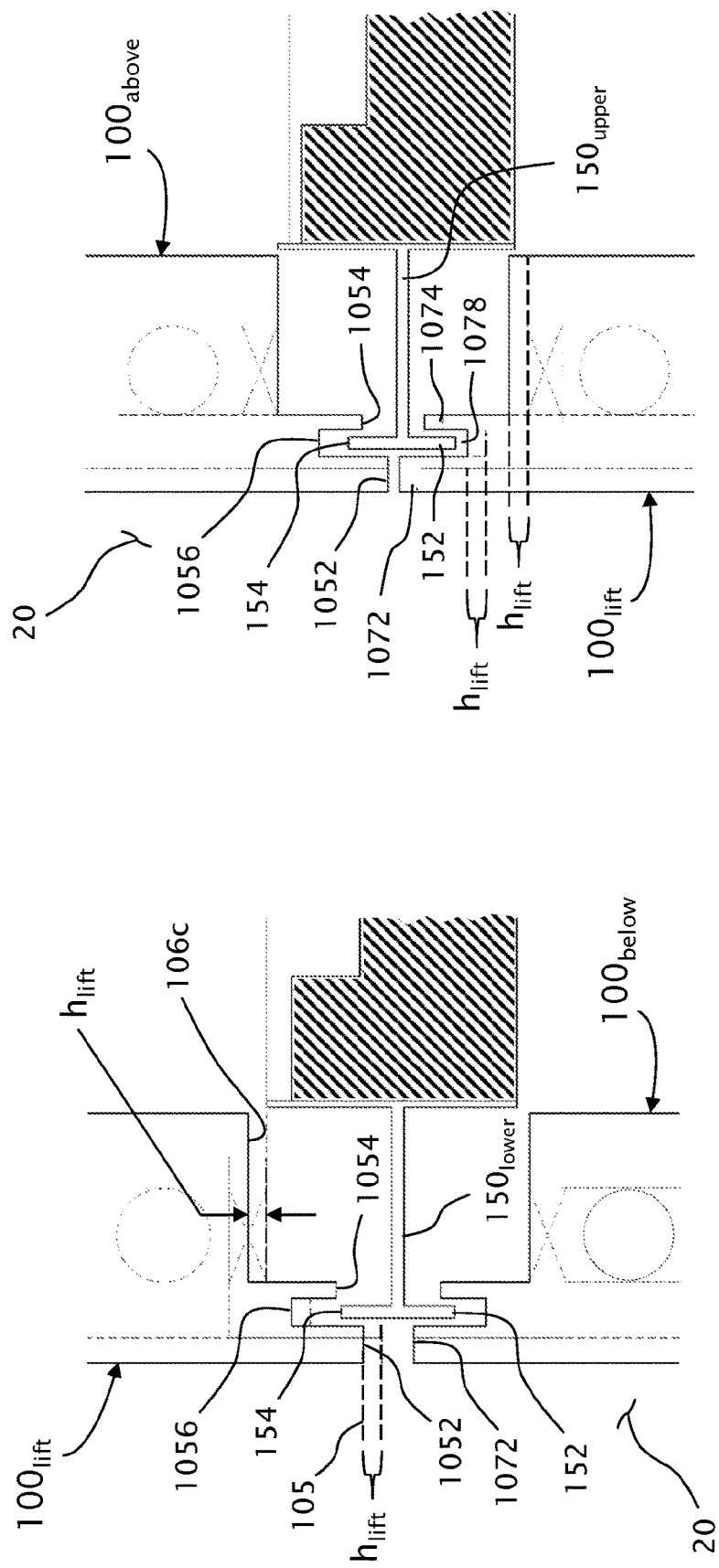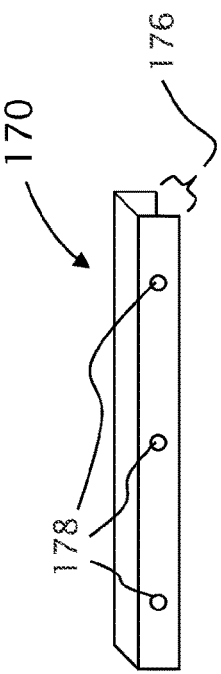
Fig. 9a
Fig. 9b
Fig. 10a

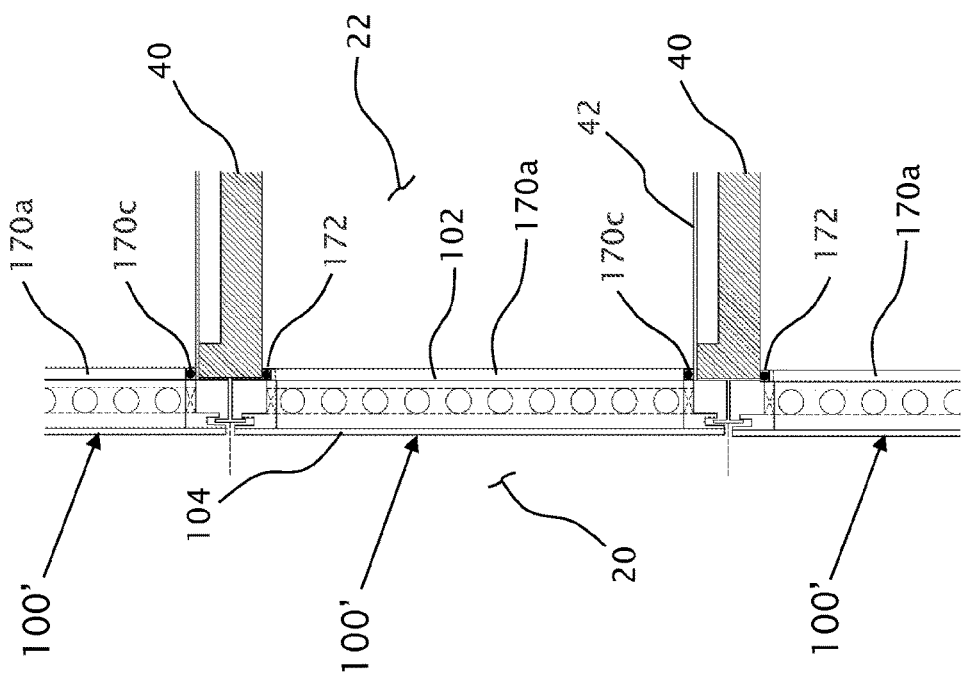
Fig. 10c CROSS SECTION 6-6
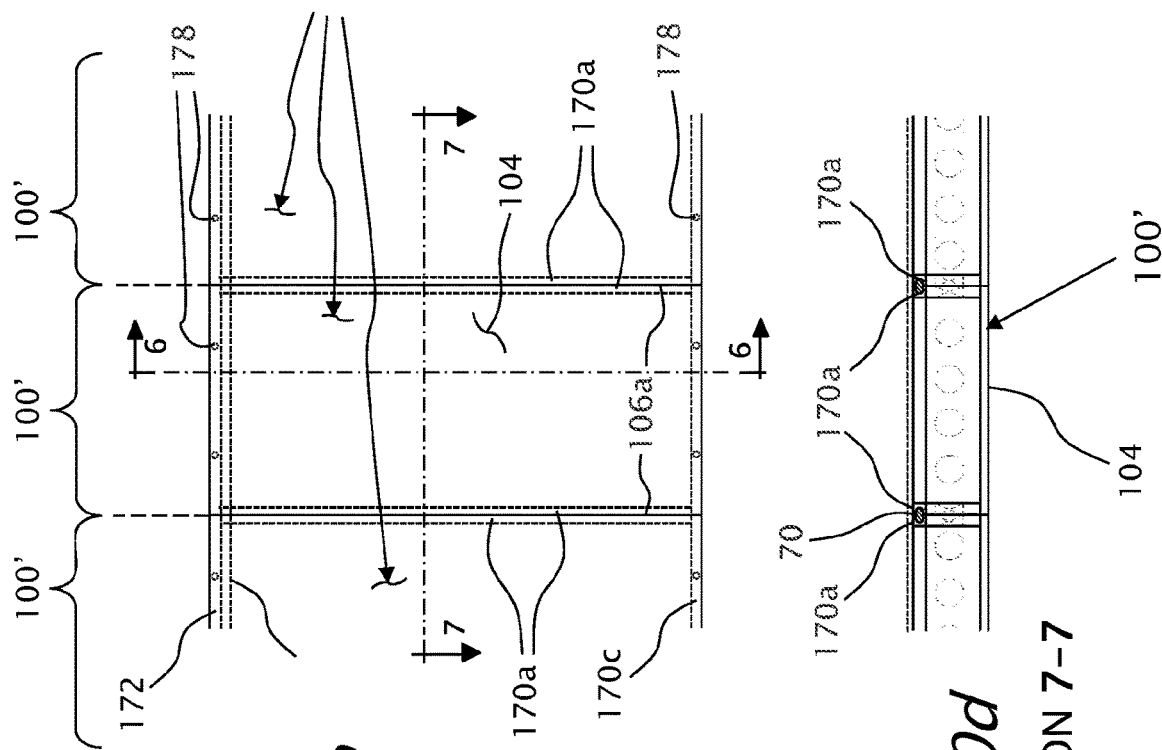
Fig. 10b
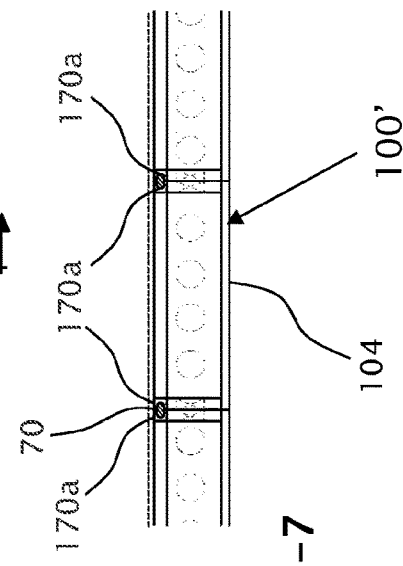
Fig. 10d CROSS SECTION 7-7

MODULAR THERMAL PANELS FOR BUILDING SHELLS AND METHODS OF ASSEMBLING AND DISASSEMBLING THEREOF

FIELD OF THE INVENTION

The present disclosure relates to panels of building shells and methods for assembling and disassembling thereof. More particularly, the present disclosure relates to modular thermal panels building shells for building shells, wherein during hot weather air flowing inside the panels provide thermal insulation to the building, and during cold weather air locked inside the panels provide thermal insulation to the building.

BACKGROUND OF THE INVENTION

In recent years, more and more buildings are built with "green" technologies in order to provide energy efficient buildings.

The façade/shells (hereinafter used interchangeably) of a building is the most important element for the energy efficiency of the building. The proper design and implementation of the facade will significantly reduce the energy consumption of the building, saving in climate-control in the inhabitable interior areas.

One common type of facade consists of a component of an outer panel that is used to cover the facade of the building. The outer panels are mounted on the rack with crossbars and serve as a thermal bridge between the house and the street. The panel is not in contact with the wall zone forming a natural convection air flow between the panel and an insulation layer that covers the wall. An example can be found in http.//xsreality.org/en/montazh-dekorativnvh-pan-elej-na-fasad-zdaniya-neobhodim-ne-tolko-dlya-dekora-konstruktsiya-zashhishhaet-stenv-ot-pogodnyh-faktorov-a-takzhe-sluzhit-dopolnitelnym-sloem-utepleniya-dlya-izgotovleniya.

United States Patent Application 20120047844 discloses paneled layers for roofs for ventilating buildings roofs.

United States Patent Application 20110036539 discloses a hollow panel being fixed to the structure of a building, and reactive to thermal radiation, namely solar radiation, including, between a first face being oriented towards a first environment and a second face being oriented towards a second environment, at least one internal fluid-circulation channel, namely air channel, extending between a first opening located at a first end edge and a second opening located at a second end edge, the internal channel extending between at least a perforated first receiver being exposed to thermal radiation on the side of first face and at least a second air-tight receiver on the side of second face and formed by a condenser, wherein the first receiver and the condenser are formed of a flexible web, namely textile web.

U.S. Pat. No. 5,347,779 discloses a high-rise building comprises an exterior wall and a sheath, which is spaced in front of said wall. Vertically extending flow channels are provided between said wall and said sheath and are open at their bottom and top and may be used to supply air to and from the interior of said building and to air-condition the interior of said building. To permit an effective control of the conditions of the ambient air adjoining said sheath, each of said flow passages communicates with the ambient air adjoining said sheath through a plurality of vertically spaced apart intake openings distributed throughout the height of said sheath.

U.S. Pat. No. 5,355,645 discloses a system and method is employed for installing a curtainwall thermally broken multi-system of four sided stopless butt-joint glazing or facing panels with dry gasketted joints. A retainer clip assembly attaches facing panels of glass, metal, granite, marble, plastic, acrylic, insulation or the like of single, multiple or composite panels. The curtain wall multi-system can have an irregular geometric impression. All field labor for initial installation or replacement takes place from inside the building. A supporting metal grid can include split mullion interlocking halves which are anchored to the building's structure. A retainer clip assembly reduces tension stress and insures a fail-safe thermal break system. Glass, facing panel, louver infills, framed operable window in one plane or multiple planes, dual glazing of glass, acrylic sheets or any combination thereof can be used with the grid. In other embodiment, thermal break spacers are positioned between interlocking portions of a mullion.

The use of glass (or similar materials) panels for building shells is also becoming common, including using smart walls. Such smart walls are typically made of double-layer glass forming an inner gap between the two layers that accommodates air, wirings etc.

However, the repairing of such a wall is difficult. There is therefore a need for modular thermal panels for building shells, wherein during hot weather air flowing inside the panels provides thermal insulation to the building, and during cold weather air locked inside the panels provides thermal insulation to the building. Furthermore, the thermal panels are interconnected such as to allow internal flow of outside air from the bottom of the shell to the top of the shell in multiple directions.

SUMMARY OF THE INVENTION

The principal intentions of the present disclosure include providing thermal building shells that are "green buildings" that are built using modern and accurate methods, allowing efficient execution time and flexibility in selecting interior and exterior materials. During the summer, air flows inside the shell via air-inlets from the bottom of the wall, which warmed up air exhaust the shell at the roof. During the winter, the top and bottom openings are closed-up and the locked in air provides thermal insulation.

According to the teachings of the present disclosure, there is provided a shell system for a building, facilitating internal bottom-up flow of air inside the shell system, the shell system includes a plurality of modular thermal panels, and connecting means for interconnecting the plurality of modular thermal panels or a portion thereof.

Each of the modular thermal panel includes:
  a) an enclosed frame having two side faces, a top face and a bottom face, wherein two openings are formed in the frame's faces;
  b) an internal face, sealingly enclosing an internal opening of the frame; and
  c) an external face, sealingly enclosing the second opening of the frame.

At least one frame-opening is formed, at a preconfigured location in each of the faces of the frame, allowing air to flow from/to adjacent modular thermal panels.

An inner gap, filled with air, is formed between the internal face and the external face of each of the modular thermal panels.

The plurality of modular thermal panels, or a portion thereof, form at least one wall having a shell-bottom edge and a shell-top edge.

The modular thermal panels are sealingly interconnected, using the connecting means, and wherein the frame-opening of adjacent frame face are aligned to allow air flow from one of the modular thermal panels to an adjacent modular thermal panel.

The at least one wall is configured to receive external ambient air from the shell-bottom edge into the inner gap, which received air flows upward, due to convection, through the frame-openings, and exhausted the at least one wall through the shell-top edge back into the external ambient air.

The modular thermal panel is individually replaceable, wherein the modular thermal panel is configured to be individually assembled from inside the interior space of the building, and individually disassembled into the inside of the interior space of the building.

Preferably, the shell system includes at least one blower for accelerating the flow rate of the air inside the inner gap. The at least one blower may be placed proximal to the shell-bottom edge pumping external ambient air into the inner gap inside the at least one wall and pumping it out to the ambient external environment. Alternatively, the at least one blower may be placed proximal to shell-top edge sucking external ambient air into the at least one wall, via the shell-bottom edge, and pumping the flowing air back out to the ambient external environment, via the shell-top edge.

During cold weather, the shell-bottom edge and the shell-top edge are sealingly closed, thereby locking air inside the inner gap inside the at least one wall.

In some embodiments, the connecting means include rails.

In some embodiments, the connecting means include a plurality of try-squares, including lower try-squares ($150_{lower}$) and upper try-squares ($150_{upper}$), wherein for each floor in the building, the horizontal try-squares include a respective lower try-square ($150_{lower}$) and a respective upper try-square ($150_{upper}$). Each try-square includes:
  a) a back panel configured to securely attach said try-square to the external belt of a floor or skeleton of the building;
  b) an interconnecting-oblong-panel extending outwardly perpendicular to said back-panel, wherein said interconnecting-oblong-panel extends outwardly a distance that match the width of said enclosed frame;
  c) an interface-oblong-panel is secured attached to the edge of said interconnecting-oblong-panel that opposes to said back-panel, wherein said interface-oblong panel extends perpendicularly from said interconnecting-oblong-panel, forming an upper-interface-edge and a lower-interface-edge.

The upper-interface-edge of a respective horizontal try-square ($150_{lower}$) is configured bear the bottom mounting device of the bottom face of the enclosed frame of the modular thermal panel assembled above that try-square ($150_{lower}$);

The lower-interface-edge of the horizontal try-square ($150_{upper}$) is configured to support the top mounting device of the top face of the enclosed frame of a modular thermal panel assembled below that try-square ($150_{upper}$). The modular thermal panel is configured to be individually assembled between the lower try-square ($150_{lower}$) and the upper try-square ($150_{upper}$) from inside the interior space of the building or from the ambient space;

The try-squares may be continuous or segmented, wherein, when using a continuous try-square, at least one try-square-opening is formed through the interconnecting-oblong-panel of the continuous try-square, to facilitate flow of air from a lower modular thermal panel to an upper modular thermal panel.

Optionally, the at least one wall further includes a sealed-frame-wall-element, wherein the sealed-frame-wall-element includes a sealing frame with no frame-openings, and wherein the sealing frame of the sealed-frame-wall-element is configured to seal an adjacent modular thermal panel, preventing air from escaping the modular thermal panel, and wherein the adjacent modular thermal panel has at least one side that allows air inflow and another side that allows air outflow.

Optionally, the sealed-frame-wall-elements include a door, a window and a window shade box.

It should be noted that four rims are formed by the internal face and the four side faces of the enclosed frame, and each of the modular thermal panel (100') further includes sealant-tunnels that is attached to the internal face at the respective rim of the internal face of each of the modular thermal panels (100'): a bottom sealant-tunnel is attached to the internal face at the bottom rim of internal face of the thermal panel; an adjustable top sealant-tunnel is attached to the internal face proximal to the top rim of the internal face of the thermal panel; and two sealant-tunnels are attached to the internal face at the respective side rim of the internal face of the thermal panel.

The adjustable top sealant-tunnel has a lower position and an upper position, and is adapted slide in the vertical direction. After the modular thermal panel has been assembled, the top sealant-tunnel, being in a lower position, is filled with a standard sealer and then slid upwards towards the ceiling of the room.

According to further teachings of the present disclosure, there is provided a panel-assembly method of assembling a replacement modular thermal panel of a building shell system, as provided here above, the method includes the steps of:
  a) providing a modular thermal panel inside the building space adjacent the shell segment designated for the provided modular thermal panel;
  b) lifting the provided modular thermal panel, being in a rest state, inside the interior space of the building, proximal to two or more lower try-squares, the modular thermal panel is configured to be assembled therebetween;
  c) transferring the modular thermal panel outwardly, through a fitted opening formed above the proximal lower try-square and extending upwardly towards the upper try-square;
  d) pivoting the external top end of the modular thermal panel until the external top end of the modular thermal panel is proximally below the lower-interface-edge of the upper try-square;
  e) lifting the modular thermal panel until the external top end of the modular thermal panel is adjacent to the upper try-square;
  f) pivoting the external bottom end of the modular thermal panel towards the interior space of the building, wherein the open edge of the inner guiding rib hovers over the lower-interface-edge of the lower try-square; and
  g) lowering the modular thermal panel towards the upper-interface-edge of the lower try-squares such that the upper-interface-edge (of the lower try-square is inserted into the bottom-gap of the bottom mounting device, until the upper-interface-edge engages to bear the gap-ceiling, bringing the modular thermal panel to a rest thereon, and thereby, the modular thermal panel reaching an assembled state.

The panel-assembly method may further include the steps of:
a) providing a modular thermal panel (100');
b) filling the sealant-tunnels with a sealant; and
c) sliding the top sealant-tunnel, being in a lower position, upwards towards the ceiling of the room.

According to further teachings of the present disclosure, there is provided a panel-disassembly method of disassembling a modular thermal panel from shell system for a building, as provided here above, the modular thermal panel being fittingly assembled to two or more lower try-squares, extending upwardly towards two or more upper try-square, the method including the steps of:
a) lifting the modular thermal panel, being in an assembled state, from the lower try-squares supporting the modular thermal panel, towards the upper try-squares clearing the modular thermal panel from the lower try-squares, facilitating an outwards pivotal motion of the external bottom end of the modular thermal panel;
b) pivoting the bottom end of the modular thermal panel outwardly, towards the exterior ambient space, until completely clearing the lower try-squares;
c) lowering modular thermal panel until the external top end of the modular thermal panel clears the upper try-square, facilitating an inwards insertion motion of the external top end of the modular thermal panel; and
d) inserting the modular thermal panel towards and into the interior space of the building, until the modular thermal panel comes to a rest there inside.

In some embodiments, the insertion motion of the modular thermal panel, towards and into the interior space of the building, is at least partially pivotal.

In some embodiments, the panel-disassembly method further includes the steps of:
a) providing a modular thermal panel (100');
b) sliding the top sealant-tunnel, being in the upper position, downwards towards the floor of the room; and
c) disassembling the modular thermal panel.

In some embodiments, the external face is made of materials selected from a group of material/components consistent of glass, curtain wall, opaque glass, solar panel, decton panel, aluminum and wood sidings.

In some embodiments, the internal face is a thermal molded panel.

BRIEF DESCRIPTION OF THE DRAWINGS

The present invention will become fully understood from the detailed description given herein below and the accompanying drawings, which are given by way of illustration and example only and thus not limitative of the present disclosure, and wherein:

FIG. 2a illustrates a side view of an example modular thermal panel, according to embodiments of the present disclosure.

FIG. 2b illustrates a top/bottom cross-section view of the modular thermal panel shown in FIG. 2a.

FIG. 2c illustrates a top perspective view of the modular thermal panel shown in FIG. 2a.

FIG. 3a illustrates an example façade of a building, built with modular thermal panels, according to embodiments of the present disclosure, showing optional flow paths of convection air inside the modular thermal panels.

FIG. 3b illustrates a cross-section view of the façade of a building shown in FIG. 3a.

FIG. 4a illustrates a cross-section view 1-1 of the façade of a building shown in FIG. 1, as denoted in FIG. 1.

FIG. 4b is a detailed view A, as denoted in FIG. 4a, showing the operative engagement of a try-square with the guiding ribs of the respective modular thermal panels.

FIG. 4c is another detailed view B, as denoted in FIG. 4a.

FIG. 5a illustrates a partial cross-section view 3-3 of the façade of a building shown in FIG. 1, as denoted in FIG. 1.

FIG. 5b illustrates a partial cross-section view 4-4 of the façade of a building shown in FIG. 1, as denoted in FIG. 1.

FIG. 5c illustrates a partial cross-section view 5-5 of the façade of a building shown in FIG. 1, as denoted in FIG. 1.

FIGS. 8a-8d illustrate, in cross-section views, an example of the disassembling of a modular thermal panel from a façade of a building as shown in FIG. 1, or 2 or any other façade of a building that is built with modular thermal panels.

FIG. 9a illustrates a detailed view similar to the detailed view B shown in FIG. 4c, wherein the upper guiding ribs of a lifted panel are shown with respect to the upper try-square.

FIG. 9b illustrates a detailed view similar to the detailed view B shown in FIG. 4c, wherein the lower guiding ribs of a lifted panel are shown with respect to the lower try-square.

FIG. 10a illustrates a sealant-tunnel having three enclosed sides and an open side, according to embodiments of the present disclosure.

FIG. 10b illustrates modular thermal panels, each having sealant-tunnels that are respectively attached to each of the four rims of the internal face of a modular thermal panel.

FIG. 10c illustrates a partial cross-section view 6-6 of a modular thermal panel having sealant-tunnels.

FIG. 10d illustrates a partial cross-section view 7-7 of a modular thermal panel having sealant-tunnels.

DETAILED DESCRIPTION OF THE INVENTION

The present disclosure will now be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided, so that this disclosure will be thorough and complete, and will fully convey the scope of the invention to those skilled in the art.

An embodiment is an example or implementation of the disclosures. The various appearances of "one embodiment," "an embodiment" or "some embodiments" do not necessarily all refer to the same embodiment. Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the disclosures. It is understood that the phraseology and terminology employed herein are not to be construed as limiting and are for descriptive purpose only.

Meanings of technical and scientific terms used herein are to be commonly understood as to which the disclosure belongs, unless otherwise defined. The present disclosure can be implemented in the testing or practice with methods and materials equivalent or similar to those described herein.

It should be noted that orientation related descriptions such as "bottom", "up", "upper", "down", "lower", "top" and the like, assumes that the associated item is operationally situated.

Figure 1:
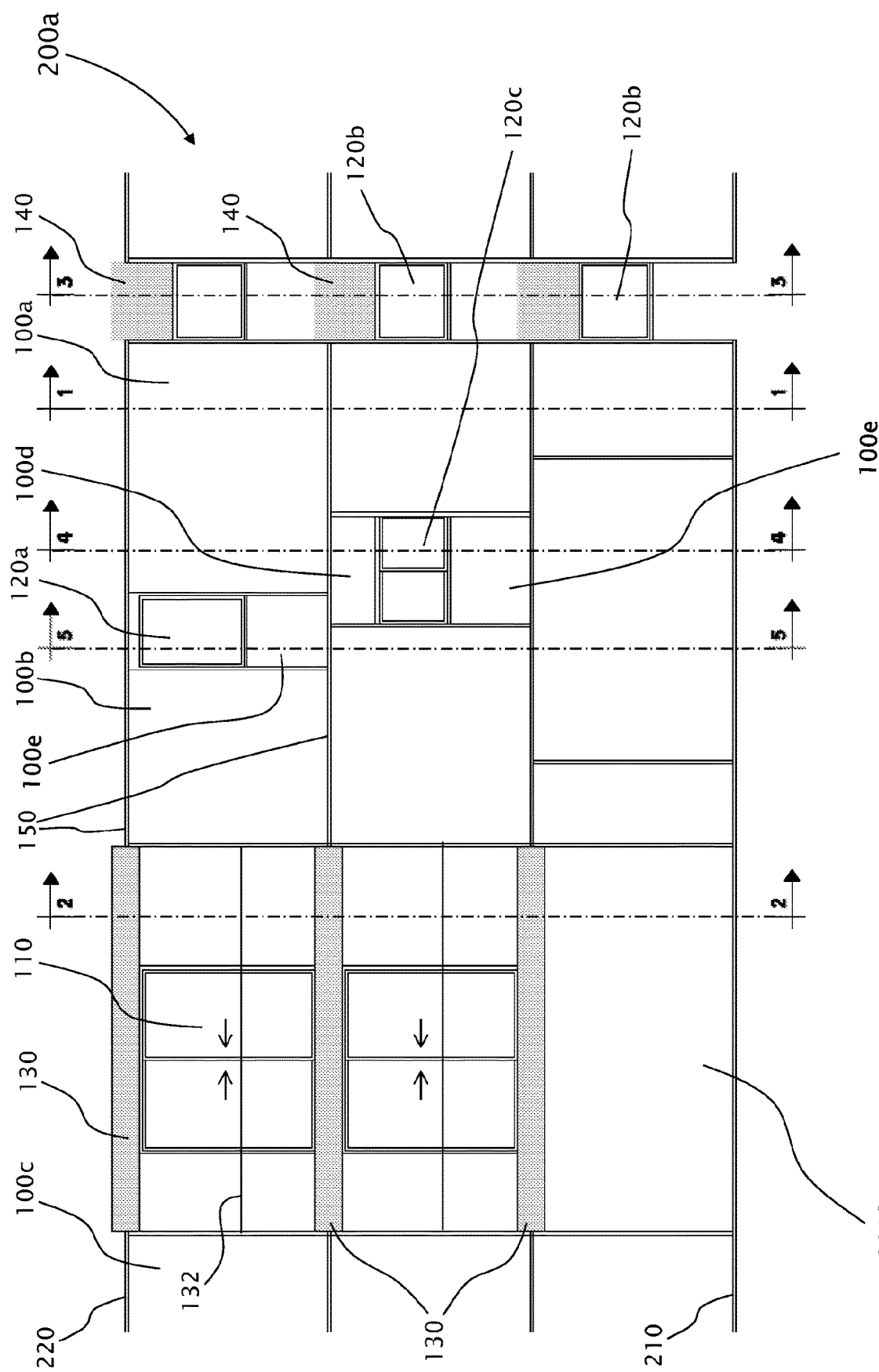
FIG. 1 illustrates an example façade of a building, built with modular thermal panels, according to embodiments of the present disclosure.

Reference is made back to the drawings. FIG. 1 illustrates an example façade 2002 of a building, built with individual modular thermal panels 100, having various sizes, according to embodiments of the present disclosure. Façade 200a may further include balcony type doors 110 or other doors, windows 120, balconies 130 that may include a balustrade 132 and/or a window shade boxes 140. Façade 200a further includes a bottom edge 210 configured to allow external ambient air to flow into façade/shell 200. Façade 200a further includes a top edge 220 configured to allow air flowing inside façade/shell 200, to exit outwardly. Where no doors or windows are involved, an individual modular thermal panel 100 extends form the bottom of a given floor to the ceiling of that floor.

Figure 2C:
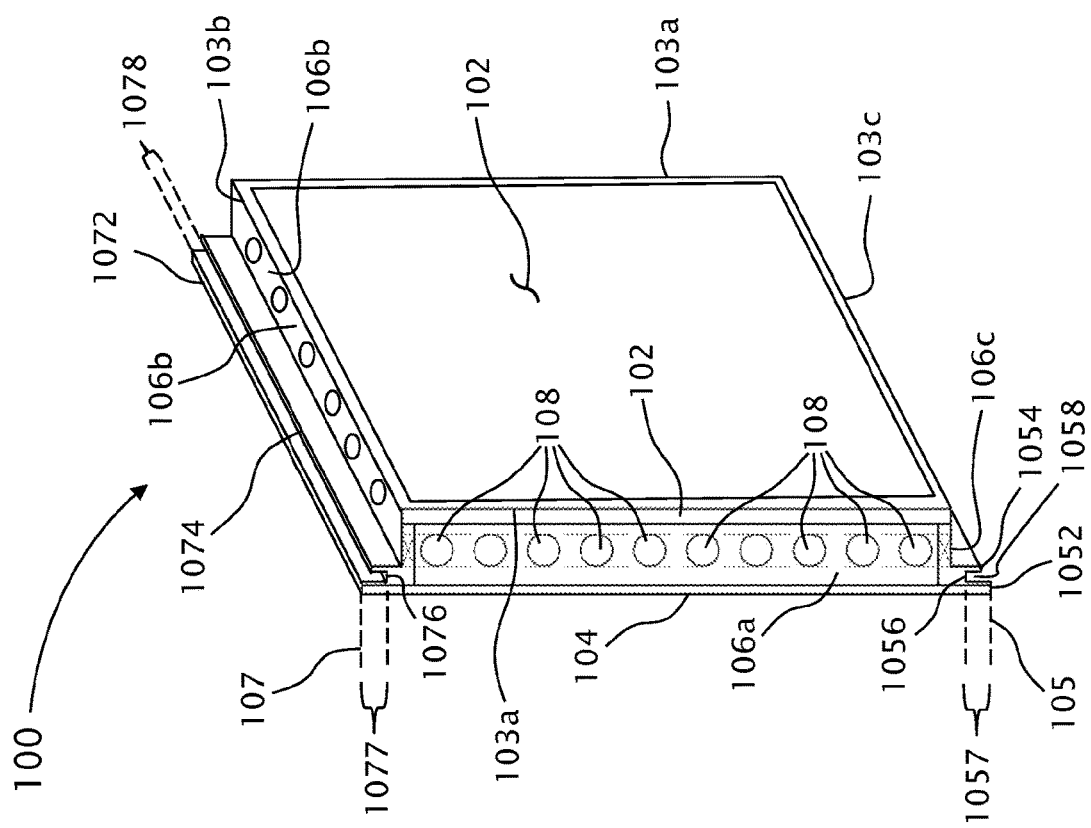
Figure 2D:
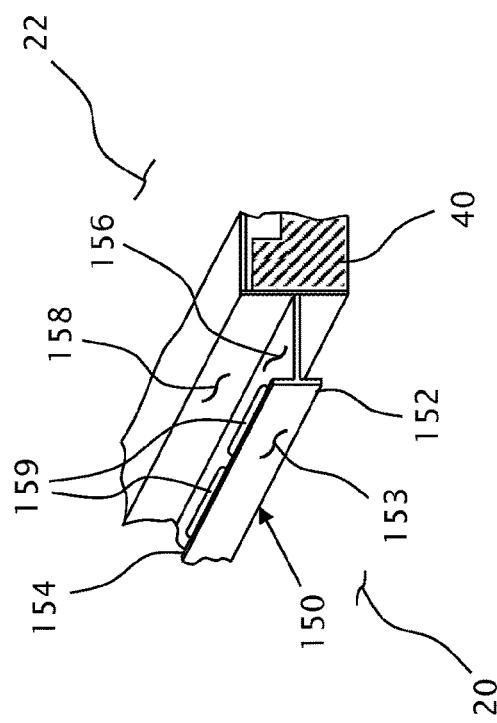
FIG. 2d illustrates a top perspective view of a try-square, being secured to the building floor skeleton, that is operatively used by the modular thermal panel shown in FIG. 2a, to assemble a wall of individual panels.

Reference is now made to FIG. 2a, illustrating a side view of an example modular thermal panel 100, according to embodiments of the present disclosure. FIG. 2b illustrates a top/bottom cross-section view of modular thermal panel 100. FIG. 2c illustrates a top perspective view of the modular thermal panel 100 shown in FIG. 2a. FIG. 2d illustrates a top perspective view of a try-square 150, being secured to the building floor skeleton (foundation) 40, that is operatively used by the modular thermal panel shown 100 in FIG. 2a, to assemble an individual panel 100, and thereby a wall of individual panels 100. It should be noted that try-square 150 is shown as a continuous unit, but try-square 150 may be segmented into any number of aligned segments.

Modular thermal panel 100 includes an enclosed frame 106, typically a quadrangle, having two side faces 106a, a top face 106b and a bottom face 106c. The top face 106b of a first panel 100 is configured to align with the bottom face 106c of another panel 100, placed on top of the first panel 100. Each side face 106a of a panel 100 is configured to align with the side face 106a of another panel 100, individually placed adjacently thereto. Modular thermal panel 100 further includes an internal face 102, sealingly enclosing the internal opening of enclosed frame 106, and an external face 104, sealingly enclosing an external opening of enclosed frame 106. An inner gap 109, filled with air, is formed between internal face 102 and external face 104. At least one opening 108 is formed in each face (106a, 106b and 106c) of frame 106, allowing air to flow from/to adjacent modular thermal panels 100. The panel-height 123 of a modular thermal panel 100 is typically the distance between the ceilings of adjacent floors, but may also be the distance between a ceiling and a window 120, or a door 110, etc. The height of a modular thermal panel 100 is measured from the bottom end 105 of external face 104, to the top end 107 of external face 104.

The top face 106b of a modular thermal panel 100 includes a top mounting device 1070 disposed at the back of the bottom end 107 of external face 104, aligned thereto. The top mounting device 1070 includes an outer guiding rib 1072 that defines the top end 107 of external face 104, and an inner guiding rib 1074. The inner guiding rib 1074 is disposed at a preconfigured distance from outer guiding rib 1072, forming a top-gap 1078 there between, having an inner-rib-depth 1077. Top-gap 1078 is terminated by a gap-floor 1076.

Similarly, the bottom face 106c of a modular thermal panel 100 includes a bottom mounting device 1050 disposed at the back of the bottom end 105 of external face 104, aligned thereto. The bottom mounting device 1050 includes an outer guiding rib 1052 that defines the bottom end 105 of external face 104, and an inner guiding rib 1054. The inner guiding rib 1054 is disposed at a preconfigured distance from outer guiding rib 1052, forming a bottom-gap 1058 there between, having an inner-rib-depth 1057. Bottom-gap 1058 is terminated by a gap-ceiling 1056.

Internal face 102 further includes four internal edges ("rims") 103 (fee FIG. 2c), wherein rims 103 are formed by internal face 102 and the four side faces (106a, 106b and 106c) of the enclosed frame (106): internal face 102 and side faces 106a form respective rims 103a, internal face 102 and bottom side face 106c form rim 103c, and internal face 102 and top side face 106b form rim 103b. It should be noted that after a modular thermal panel 100 has been mounted onto a respective pair of lower try-square 150, the mounted modular thermal panel 100 is moved adjacently next to a previously mounted the modular thermal panel 100, until the walls of all of the building floors are assemble, to form a façade/shell 200.

In some embodiments, wheels (not shown) are assembled at the gap-ceiling 1056 of mounted modular thermal 100 to facilitate lateral motion of the modular thermal panel 100 over the top end (154) of the try-square $150_{lower}$. Thereby, accelerating the assembly process of a plurality of individual modular thermal panels 100 of at least a portion of the wall of a floor of façade/shell 200.

It should be noted that external face 104 may be made of materials selected from a group of material/components including glass, curtain wall, opaque glass, solar panel, decton panel, aluminum or wood sidings, other material/components known in the art. The internal face 102 may be any thermal molded panel.

FIG. 3a illustrates an example façade 200b of another building, built with individual modular thermal panels 100, having various sizes, demonstrating optional flow paths of convection air 50 inside the individual modular thermal panels 100. FIG. 3b illustrates a cross-section view of the façade 200b. By having a number of openings 108 formed in each face of frame 106, allows for air 50 to flow from one modular thermal panel 100 to a number of adjacent modular thermal panels 100, not involving any of the inner spaces 22 of the building. FIG. 3b further illustrates an optional blower 190, placed proximal to shell-top edge 220, that accelerates the flow rate of air 50 inside inner gap 109 of façade 200b, for example, by sucking external ambient air 50 into façade/shell 200 via shell-bottom edge 210, and pumping the flowing air 50 back out to the ambient external environment, via shell-top edge 220. Alternatively, a blower 190 may be placed proximal to shell-bottom edge 210 sucking external ambient air into façade/shell 200 via shell-bottom edge 210, which flowing air 50 flows out of façade/shell 200 to the ambient external environment, via shell-top edge 220.

The frames of the doors 110 and windows 120 are sealed to thereby prevent the escape of flowing air 50 other than from the shell-top edge 220 of façade/shell 200. Façade/shell 200 may further include other construction items that have sealed frames, such as curtain walls 160, window shade boxes 140, etc.

Typically, during the summer, air 50 flows inside the shell system 200 via air-inlets at the shell-bottom edge 210. The air 50 inside the shell system 200 further warms up and due to convection causes the warmed-up air 50 to flow upwards, moving from one modular thermal panel 100 to one or more adjacent modular thermal panels 100, all the way to shell-top edge 220 of façade/shell 200. When reaching the shell-top edge 220 of façade/shell 200, the warmed-up air 50 exhausts the façade/shell 200.

During the winter, the openings at the shell-bottom edge 210 and the shell-top edge 220 are closed-up and the locked-in air 50 provides thermal insulation to the building.

Figures 4A, 4B, 4C:
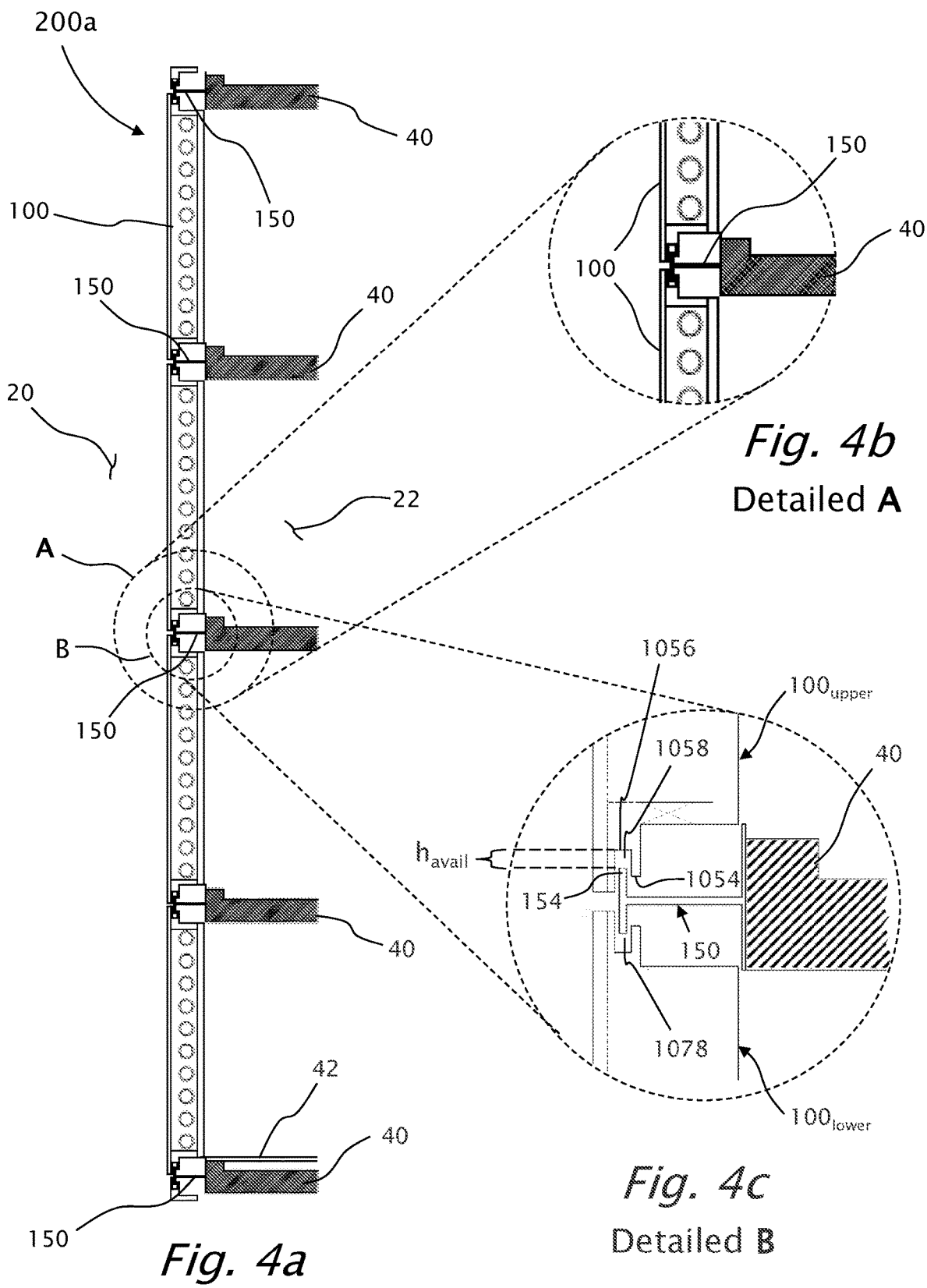

Modular thermal panels 100 may be installed on rails or try-squares 150 (see FIG. 1). FIG. 4a illustrates a cross-section view 1-1 of the façade 200a of a building, as denoted in FIG. 1. FIG. 4b is a detailed view A, as denoted in FIG. 4a sowing the connection intersection of two adjacent modular thermal panels 100 mounted onto a try-square 150, wherein the try-square 150 is secured to the building floor foundation 40 or to any other part of the building's skeleton. FIG. 4c is another, more detailed view B (see FIG. 4a), showing the operative engagement of a try-square 150 with the respective guiding ribs (1052, 1054, 1072, 1074) of the respective modular thermal panels 100. Referring back to FIG. 2d, a try-square 150 typically includes, for example, a back panel 158 configured to securely attach try-square 150 to the external belt of the building floor foundation 40 or skeleton. Back panel 158 is typically, with no limitation, facing the outside wall of façade/shell 200. It should be noted that, typically, the upper surface of the building floor foundation 40 is covered by a final floor flooring 42.

Try-square 150 further includes, for example, an interconnecting-oblong-panel 156 extending outwardly perpendicular to back-panel 158, wherein an interface-oblong-panel 153 is secured attached to the edge opposite to back-panel 158. Interconnecting-oblong-panel 156 extends outwardly a distance that match the width of enclosed frame 106. Typically, the lateral cross section of the interconnecting-oblong-panel 156 and the interface-oblong-panel 153 has a T-shape. The interface-oblong panel 153 extends perpendicularly from interconnecting-oblong-panel 156 (and parallel to back-panel 158), typically with no limitations, symmetrically, forming an upper-interface-edge 154 and a lower-interface-edge 152. It should be noted that try-square-openings 159, typically oval openings, are preferably formed through interconnecting-oblong-panel 156 to facilitate flow of air from a lower modular thermal panel 100 to an upper modular thermal panel 100. Alternatively, interconnecting-oblong-panel 156 may be segmented, in which embodiment interface-oblong-panel 153 may also be segmented and back-panel 158 may also be segmented.

Referring back to FIG. 4c, the lower section of an upper modular thermal panel $100_{upper}$ and the upper section of a are shown assembled with a try-square 150. The lower section of an upper modular thermal panel $100_{upper}$ is mounted onto the upper-interface-edge 154 that is inserted through the bottom-gap 1058 of upper modular thermal panel $100_{lower}$. However, a vertical gap $h_{avail}$ between the top end 154 of try-square 150 and the gap-ceiling 1056 of bottom-gap 1058 of upper modular thermal panel $100_{lower}$, sustains, facilitation lifting modular thermal panel $100_{lower}$ by up to $h_{avail}$. For example, with no limitations, $h_{avail}$=3 cm.

The upper section of a lower modular thermal panel $100_{lower}$ is interfaced with the lower-interface-edge 152, wherein, when assembled, lower modular thermal panel $100_{lower}$ was pushed upwards such that the lower-interface-edge 152 is inserted into the top-gap 1078 of the top mounting device 1070 of lower modular thermal panel $100_{lower}$.

It should be noted that, operatively, at least some of the gaps shown in the figures are fill with sealing materials, shock absorbing materials and/or other materials.

It should be noted that typically, try-squares 150 may be used when there is no need to approach the modular thermal panels 100 from inside the building or when the interior space is vacant and allows approaching modular thermal panels 100 from inside. Rails may be used when it is required to approach the modular thermal panels 100 from inside, and the only way to do it is to move the modular thermal panels 100 on a rail in order-to gain accessibility to the modular thermal panels 100.

FIG. 5a illustrates a partial cross-section view 3-3 of the façade 200a of a building, as denoted in FIG. 1, showing the interface between a window 120b and window shade boxes 140. FIG. 5b illustrates a partial cross-section view 4-4 of the façade 200a of a building, as denoted in FIG. 1, showing the interface between a window 120c and modular thermal panels 100d and 100e. FIG. 5c illustrates a partial cross-section view 5-5 of the façade 200a of a building, as denoted in FIG. 1, showing the interface between a window 120a and modular thermal panels 100.

Figure 6:
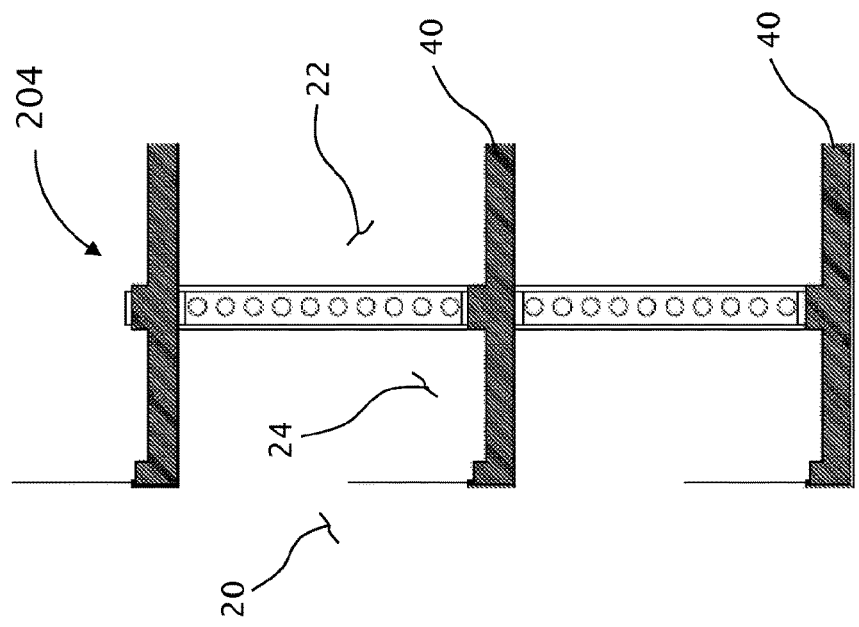
FIG. 6 illustrates a cross-section view 2-2 of a balcony region of the façade of a building shown in FIG. 1, as denoted in FIG. 1.
Figure 7:
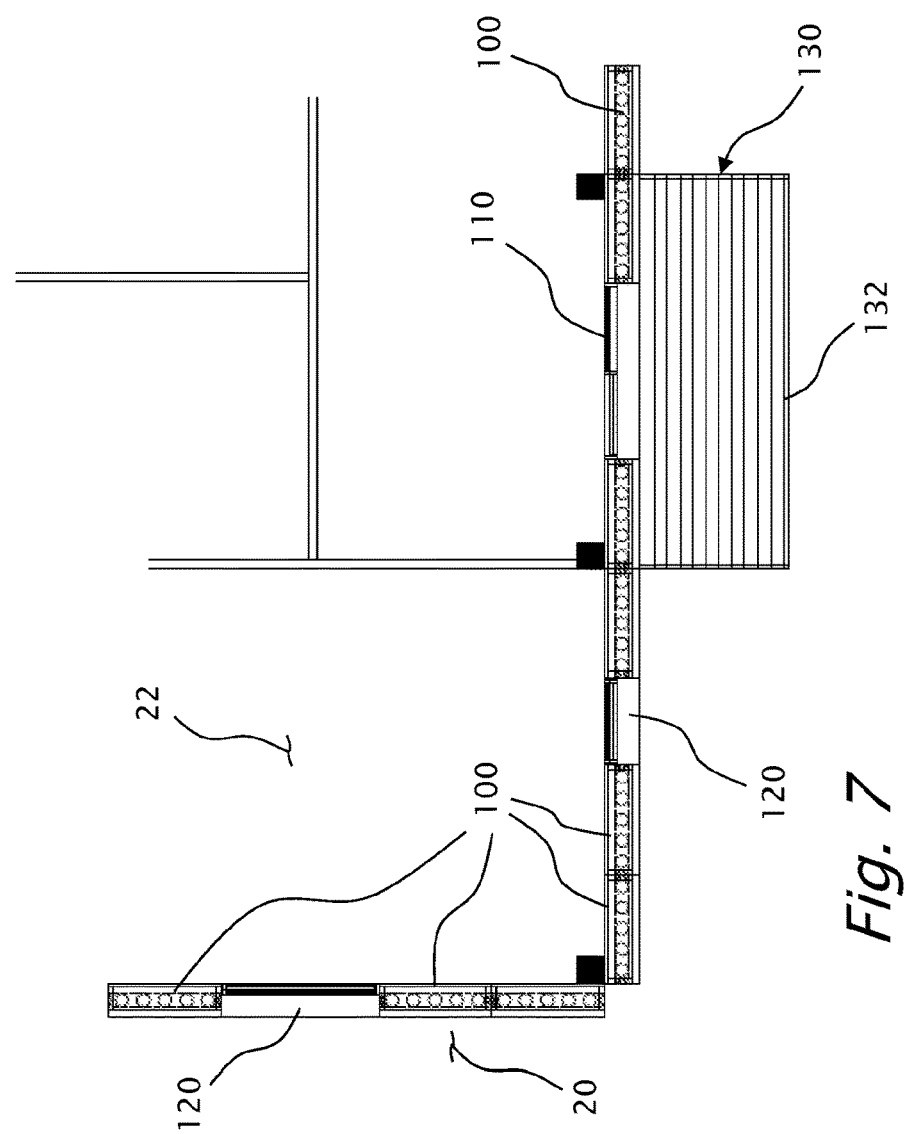
FIG. 7 illustrates a top, partial cross-section view of a balcony of the façade of a building shown in FIG. 1.

FIG. 6 illustrates a cross-section view 2-2 of a balcony 130 region of the façade 200a of a building, as denoted in FIG. 1. FIG. 7 illustrates a top, partial cross-section view of a balcony 130 of floor layout 204 of a façade 200 of a building. Various sized modular thermal panels 100 are shown, wherein the interior space 22 is shown as well as the exterior ambient space 20. The balcony's moving doors 110 are shown interfaced with the adjacent modular thermal panels 100.

FIGS. 8a-8d illustrate, in cross-section views, an example of the disassembling of a modular thermal panel 100 from a façade 200 of a building as shown in FIG. 1 or 2 or any other façade of a building that is built using modular thermal panels 100. FIG. 8a illustrates a modular thermal panel $100_{p0}$ in an assembled state. In the example shown, with no limitations, the panel-height 123 of a modular thermal panel 100 is typically the distance between the ceilings of adjacent floors, or more precisely, the distance between the two adjacent try-squares 150, being the floor-height 153. That is, panel-height 123≤floor-height 153.

FIG. 8b illustrates a modular thermal panel $100_{p1}$, being a first intermediate state $P_1$. After lifting modular thermal panel 100 a bit, for example, with no limitations, by 3 cm, modular thermal panel 100 is tilted outwardly by moving the external bottom end 105 of external face 104 outwardly towards the exterior ambient space 20, until the internal bottom end of frame 106 clears the lower try-square $150_{lower}$.

Reference is also made to FIGS. 9a and 9b. FIG. 9a illustrates a detailed view similar to the detailed view B shown in FIG. 4c, wherein the upper guiding ribs (1072 and 1074) of a lifted panel $100_{lift}$ are shown with respect to the upper try-square $150_{upper}$. FIG. 9b illustrates a detailed view similar to the detailed view B shown in FIG. 4c, wherein the lower guiding ribs (1052 and 1054) of the lifted panel 100$_{lift}$ are shown with respect to the lower try-square 150$_{lower}$.

When lifting modular thermal panel 100$_{lift}$ (see FIG. 9*a*), for example when disassembling 100$_{lift}$, modular thermal panel 100$_{lift}$ can be lifted by up to h$_{avail}$. For example, with no limitations, h$_{avail}$=3 cm. as can be seen in FIG. 9*b*, the lower section of the lifted modular thermal panel 100$_{lift}$ is lifted by the same amount. The lifting distance him should be enough to facilitate the inner guiding rib 1054 of lifting distance him to clear the upper-interface-edge 154 of the lower try-square 150$_{lower}$ by hovering thereover. The lower section of the lifted modular thermal panel 100$_{lift}$ can now by pivoted outwardly, towards the exterior ambient space 20.

FIG. 8*c* illustrates a modular thermal panel 100$_{p2}$, being in a second intermediate state P$_2$. After tilting the external bottom end 105 of modular thermal panel 100 outwardly, until the internal bottom end 106*c* of frame 106 clears the lower try-square 150$_{lower}$, modular thermal panel 100 is lowered until the external top end 107 of external face 104 clears under the upper try-square 150$_{upper}$.

FIG. 8*d* illustrates a modular thermal panel 100$_{p3}$, P$_3$ being third intermediate states P$_{3'}$ and P$_{3''}$, in which modular thermal panel 100 is pivotally tilted inwardly, towards and into the interior space 22 of the building, until modular thermal panel 100$_{p4}$ comes to a rest state P$_4$, which is typically, with no limitations, a horizontal state.

It should be noted that the floor-height 123 is also measured from the lower try-square 150$_{lower}$ of a given building floor foundation 40, to the upper try-square 150$_{upper}$ of that building floor foundation 40, as shown in FIG. 8*a*.

It should be noted that the assembly of a modular thermal panel 100 may be performed in the reverse order of the disassembling method, as illustrated in FIGS. 8*a*-8*d*, and is respectively described in the above description.

Reference is now made to FIG. 10*a*, which illustrates a sealant-tunnel 170 having three enclosed sides and an open side 176. FIG. 10*b* illustrates modular thermal panels 100', each having sealant-tunnels (170, 172) that are respectively attached to the internal face 102 at each of the four rims 103 of a modular thermal panel 100', as follows: a bottom sealant-tunnel 170*c* is attached to the internal face 102 at the bottom rim 103*c* of the thermal panel 100', an adjustable top sealant-tunnel 172 is attached to the internal face 102 at the top rim 103*b* of the thermal panel 100', and two sealant-tunnels 170*a* are attached to the internal face 102 at the respective side rim 103*a* of the thermal panel 100'. FIG. 10*b* illustrates the modular thermal panels 100' as viewed from the exterior ambient space 20 towards the external face 104 of the thermal panels 100'. FIG. 10*c* illustrates a partial cross-section view 6-6 of a modular thermal panel 100' shown in FIG. 10*b*. FIG. 10*d* illustrates a partial cross-section view 7-7 of a modular thermal panel 100' shown in FIG. 10*b*.

Bottom sealant-tunnel 170*c* is attached to the internal face 102 at the bottom rim 103*c* of the thermal panel 100', such that the open side 176 is facing the upper surface of the building floor foundation 40 (and/or the final floor flooring 42), as illustrated in FIG. 10*c*. After (and/or before) a modular thermal panel 100' has been assembled, bottom sealant-tunnel 170*c* is filled with a standard sealer, via one or more side openings 178 formed in a side of bottom sealant-tunnel 170*c* (see FIGS. 10*a* and 10*b*). Thereby, sealing the interior space 22 of the room/building from the exterior space 20 at that bottom face 106*c*.

The two sealant-tunnels 170*a* are attached to the internal face 102 at the respective side rim 103*a* of the such that the open side 176 is facing the open side 176 the sealant-tunnel 170*a* of the adjacently neighboring thermal panel 100', as illustrated in FIG. 10*d*. Thereby, sealing the interior space 22 of the room/building from the exterior space 20 at that side face 106*a*.

The top sealant-tunnel 172 is an adjustable sealant-tunnel 170 that has a lower position and an upper position, and can slide in the vertical direction. After a modular thermal panel 100' has been assembled, top sealant-tunnel 172, being in a lower position, is filled with a standard sealer and then slid upwards towards the ceiling of the room (interior space 22 of the building), as shown in FIG. 10*c*. Thereby, sealing the interior space 22 of the room/building from the exterior space 20 at that top face 106*c*. When all four rims of the internal face 102 of a thermal panel 100' are sealed, that thermal panel 100' seals the interior space 22 of the room/building from the exterior space 20.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A shell system (200) for a building, having an interior space and an exterior ambient space, facilitating internal bottom-up flow of air inside the shell system, the shell system comprising:
   a) a plurality of modular thermal panels (100), wherein each said modular thermal panel comprises:
      i. an enclosed frame (106) having two side faces (106*a*), a top face (106*b*) and a bottom face (106*c*), wherein two openings are formed in said frame faces;
      ii. an internal face (102), sealingly enclosing an internal opening of said frame; and
      iii. an external face (104), sealingly enclosing an external opening of said frame;
   b) a plurality of horizontal try-squares (150) for individually assembling each one of said plurality of modular thermal panels, wherein each try-square comprises:
      i. a back panel (158) configured to securely attach said try-square to an external belt of a floor or skeleton of the building;
      ii. an interconnecting-oblong-panel (156) extending outwardly perpendicular to said back-panel, wherein said interconnecting-oblong-panel (156) extends outwardly a distance that match the width of said enclosed frame (106);
      iii. an interface-oblong-panel (153) is secured attached to the edge of said interconnecting-oblong-panel that opposes to said back-panel, wherein said interface-oblong panel (153) extends perpendicularly from said interconnecting-oblong-panel (156), forming an upper-interface-edge (154) and a lower-interface-edge (152),
   wherein at least one frame-opening (108) is formed, at a preconfigured location in each of said faces (106*a*, 106*b* and 106*c*) of said frame, allowing air to flow from/to any adjacent modular thermal panel;
   said top face (106*b*) of said enclosed frame (106) further comprises a top mounting device (1070) and wherein said bottom face (106*c*) of said enclosed frame (106) further comprises a bottom mounting device (1050);
   an inner gap (109), filled with air, is formed between said internal face (102) and said external face (104) of each said modular thermal panels;

said plurality of modular thermal panels, or a portion thereof, form at least one wall having a shell-bottom edge (210) and a shell-top edge (220);

said modular thermal panels are sealingly interconnected, using said tri-squares, and said frame-openings of all adjacent frame faces are aligned to allow air flow between one of said modular thermal panels and any adjacent said modular thermal panel;

said at least one wall is configured to receive external ambient air only from said shell-bottom edge into said inner gap, which received air flows upward, due to convection, through said frame-openings, and to exhaust said at least one wall only through said shell-top edge back into the external ambient air;

for each floor in the building, said horizontal try-squares (150) include a respective lower try-square (150lower) and a respective upper try-square (150upper);

each said upper-interface-edge (154) of a respective said horizontal try-square (150lower) is configured to bear said bottom mounting device (1050) of said bottom face (106*c*) of said enclosed frame (106) of a modular thermal panel (100) assembled above that try-square (150lower);

each said lower-interface-edge (152) of said horizontal try-square (150upper) is configured to support said top mounting device (1070) of said top face (106*b*) of said enclosed frame (106) of a modular thermal panel (100) assembled below that try-square (150upper);

each said modular thermal panel (100) is configured to be individually assembled between said lower try-square (150lower) and said upper try-square (150upper) from inside the interior space (22) of the building or from the exterior ambient space (20);

said try-squares (150) are continuous or segmented; and when using a continuous try-square, at least one try-square-opening (159) is formed through said interconnecting-oblong-panel (156) of said continuous try-square, to facilitate flow of air from a lower said modular thermal panel (100) to an upper said modular thermal panel (100).

2. The shell system of claim 1, wherein said top mounting device (1070) comprises:

a) an outer guiding rib (1072) that defines a top end (107) of said external face (104); and b) an inner guiding rib (1074), said inner guiding rib (1074) is disposed at a preconfigured distance from said outer guiding rib (1072), forming a top-gap (1078) there between, having an inner-rib-depth (1077), and said top-gap (1078) is terminated by a gap-floor (1076);

said bottom mounting device (1050) comprises:

a) an outer guiding rib (1052) that defines a bottom end (105) of said external face (104); and b) an inner guiding rib (1054), said inner guiding rib (1054) is disposed at a preconfigured distance from said outer guiding rib (1052), forming a bottom-gap (1058) there between, having an inner-rib-depth (1057), and said bottom-gap (1058) is terminated by a gap-ceiling (1056);

when said modular thermal panel is assembled, said modular thermal panel is pushed upwards such that said lower-interface-edge (152) of said upper try-square (150upper) is inserted into said top-gap (1078) of said top mounting device (1070); and after said lower-interface-edge (152) of said upper try-square (150upper) has been inserted into said top-gap (1078) of said top mounting device (1070), said bottom mounting device (1050) is pivoted towards said lower try-square (150lower), the open edge of said inner guiding rib (1054) hovers over said upper-interface-edge (154) of said lower try-square (150lower) and then, said modular thermal panel (100) is moved downwards such that said upper-interface-edge (154) of said lower try-square (150lower) is inserted into said bottom-gap (1058) of said bottom mounting device (1050), until said upper-interface-edge (154) engages to bear said gap-ceiling (1056).

3. The shell system of claim 1, wherein after said modular thermal panel has been mounted between said lower try-square (150lower) and said upper try-square (150upper), said mounted modular thermal panel is positioned adjacently, side-by-side, next to a previously mounted said modular thermal panel, until the walls of all of the building floors are assembled.

4. The shell system of claim 2, wherein said bottom mounting device (1050) further comprises wheels at the gap-ceiling (1056) of said mounted modular thermal (100) to thereby facilitate accelerated lateral motion of the modular thermal panel (100) over said top end (154) of said try-square (150lower).

5. The shell system of claim 1, wherein said modular thermal panel is individually replaceable, and wherein said modular thermal panel is configured to be individually assembled from inside the interior space (22) of the building, and individually disassembled into the inside of the interior space (22) of the building.

6. The shell system of claim 1 further comprises at least one blower (190) for accelerating the flow rate of the air inside said inner gap.

7. The shell system of claim 6, wherein said at least one blower is placed proximal to said shell-bottom edge pumping external ambient air into said inner gap inside said at least one wall and pumping it out to the ambient external environment.

8. The shell system of claim 6, wherein said at least one blower is placed proximal to the shell-top edge sucking external ambient air into said at least one wall, via said shell-bottom edge, and pumping the flowing air back out to the ambient external environment, via said shell-top edge.

9. The shell system of claim 1, wherein during cold weather, said shell-bottom edge and said shell-top edge are sealingly closed, thereby locking air inside said inner gap inside said at least one wall.

10. The shell system of claim 1, wherein said at least one wall further includes a sealed-frame-wall-element, said sealed-frame-wall-element includes a sealed frame with no frame-openings; and said sealed frame of said sealed-frame-wall-element is configured to seal an adjacent said modular thermal panel, preventing air from escaping said modular thermal panel, and said adjacent modular thermal panel has at least one side that allows air inflow and another side that allows air outflow.

11. The shell system of claim 10, wherein said sealed-frame-wall-elements are selected from a group of sealed frame elements including doors (110), windows (120), curtain walls (160), and window shade boxes (140).

12. The shell system of claim 1, wherein said external face is made of materials selected from a group of material/components consistent of glass, curtain wall, opaque glass, solar panel, decton panel, aluminum and wood sidings.

13. The shell system of claim 1, wherein said internal face is a thermal molded panel.

14. The shell system of claim 1, wherein four rims are formed by said internal face (102) and the four side faces of the enclosed frame (106), and
  each of said modular thermal panels (100') further comprises a sealant-tunnel (170, 172) that is attached to the internal face (102) at the respective rim of the internal face, as follows:
  a bottom sealant-tunnel (170c) is attached to the internal face at a bottom rim (106c) of the internal face of the thermal panel (100');
  an adjustable top sealant-tunnel (172) is attached to the internal face proximal to a top rim (106b) of the internal face of the thermal panel (100'); and
  two sealant-tunnels (170a) are attached to the internal face at a respective side rim (103a) of the internal face of the thermal panel (100').

15. The shell system of claim 14, wherein said adjustable top sealant-tunnel has a lower position and an upper position, and is adapted to slide in the vertical direction, and after said modular thermal panel has been assembled, said top sealant-tunnel, being in a lower position, is filled with a standard sealer and then slid upwards towards the ceiling of a respective room.

16. A panel-assembly method of assembling a modular thermal panel (100) of a building shell system (200), as provided in claim 2, comprising the steps of:
  a) providing a modular thermal panel (100) inside the building space adjacent the shell segment designated for said provided modular thermal panel (100);
  b) securely lifting said provided modular thermal panel, tilting said lifted modular thermal panel and moving said lifted modular thermal panel to the exterior ambient space (20);
  c) moving said modular thermal panel until said top mounting device (1070) of said modular thermal panel is proximal to said lower-interface-edge (152) of said upper try-square (150upper);
  d) pushing said modular thermal panel upwards such that said lower-interface-edge (152) of said upper try-square (150upper) is inserted into a said top-gap (1078) of said top mounting device (1070);
  e) pivoting said bottom mounting device (1050) of said modular thermal panel towards the interior space (22) of the building and towards said lower try-square (150lower), wherein the open edge of said inner guiding rib (1054) hovers over said lower-interface-edge (152) of said lower try-square (150lower); and
  f) lowering said modular thermal panel towards said upper-interface-edge (154) of said lower try-squares (150lower) such that said upper-interface-edge (154) of said lower try-square (150lower) is inserted into said bottom-gap (1058) of said bottom mounting device (1050), until said upper-interface-edge (154) engages to bear said gap-ceiling (1056) bringing said modular thermal panel to a rest thereon, and thereby said modular thermal panel reaches an assembled state.

17. The panel-assembly method as in claim 16, further comprising the steps of:
  a) providing a modular thermal panel (100') wherein four rims are formed by said internal face (102) and the four side faces of the enclosed frame (106),
  each of said modular thermal panels (100') further comprises a sealant-tunnel (170, 172) that is attached to the internal face (102) at the respective rim of the internal face, as follows:
  a bottom sealant-tunnel (170c) is attached to the internal face at the bottom rim (106c) of the internal face of the thermal panel (100');
  an adjustable top sealant-tunnel (172) is attached to the internal face proximal to the top rim (106b) of the internal face of the thermal panel (100');
  two sealant-tunnels (170a) are attached to the internal face at the respective side rim (103a) of the internal face of the thermal panel (100');
  said adjustable top sealant-tunnel has a lower position and an upper position, and is adapted to slide in the vertical direction, and after said modular thermal panel has been assembled, said top sealant-tunnel, being in a lower position, is filled with a standard sealer and then slid upwards towards the ceiling of the room;
  b) filling said sealant-tunnels (170, 172) with a sealant; and
  c) sliding said top sealant-tunnel, being in a lower position, upwards towards the ceiling of a respective room.

18. A panel-disassembly method of disassembling a modular thermal panel (100) from shell system (200) for a building, as provided in claim 2, said modular thermal panel being mounted on said lower try-square (150lower), extending upwardly towards said upper try-square (150upper), comprising the steps of:
  a) securely upright lifting said modular thermal panel, being in an upright assembled state, from said lower try-squares (150lower) supporting said bottom mounting device (1050) of said modular thermal panel, such that said gap-floor (1076) moves towards said lower-interface-edge (152) of said upper try-squares (150upper);
  b) when said inner guiding rib (1054) clears said upper-interface-edge (154) of said lower try-square (150lower), clearing of said modular thermal panel from said lower try-squares (150lower) to thereby facilitate an outwards pivotal motion of said external bottom end (105) of said modular thermal panel;
  c) pivoting said bottom end of said modular thermal panel outwardly, towards the exterior ambient space (20), including hovering said inner guiding rib (1054) over said upper-interface-edge (154), until completely clearing said lower try-squares (150lower);
  d) lowering said modular thermal panel until said external top mounting device (1070) of said modular thermal panel clears said upper try-square (150upper), facilitating an inwards insertion motion of said external top end (107) of said modular thermal panel; and
  e) inserting said modular thermal panel towards and into the interior space (22) of the building, until said modular thermal panel comes to a rest there inside.

19. The panel-disassembly method of claim 18, wherein said insertion motion of said modular thermal panel, towards and into the interior space of the building, is at least partially pivotal.

20. The panel-disassembly method of claim 19, further comprising the steps of:
  a) providing a modular thermal panel (100') wherein four rims are formed by said internal face (102) and the four side faces of the enclosed frame (106),
  each of said modular thermal panels (100') further comprises a sealant-tunnel (170, 172) that is attached to the internal face (102) at the respective rim of the internal face, as follows:
  a bottom sealant-tunnel (170c) is attached to the internal face at the bottom rim (106c) of the internal face of the thermal panel (100');

an adjustable top sealant-tunnel (172) is attached to the internal face proximal to the top rim (106*b*) of the internal face of the thermal panel (100');

two sealant-tunnels (170*a*) are attached to the internal face at the respective side rim (103*a*) of the internal face of the thermal panel (100');

said adjustable top sealant-tunnel has a lower position and an upper position, and is adapted to slide in the vertical direction, and after said modular thermal panel has been assembled, said top sealant-tunnel, being in a lower position, is filled with a standard sealer and then slid upwards towards the ceiling of the room;

b) sliding said top sealant-tunnel, being in the upper position, downwards towards the floor of a respective room; and c) disassembling said modular thermal panel.

\* \* \* \* \*